US008437558B1

(12) United States Patent
Medasani et al.

(10) Patent No.: US 8,437,558 B1
(45) Date of Patent: May 7, 2013

(54) VISION-BASED METHOD FOR RAPID DIRECTED AREA SEARCH

(75) Inventors: Swarup Medasani, Thousand Oaks, CA (US); Yuri Owechko, Newbury Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 839 days.

(21) Appl. No.: 12/587,642

(22) Filed: Oct. 8, 2009

(51) Int. Cl.
*G06K 9/00* (2006.01)
*G06K 9/62* (2006.01)
*G06K 9/34* (2006.01)

(52) U.S. Cl.
USPC ........... 382/225; 382/228; 382/103; 382/104; 382/173

(58) Field of Classification Search ............... 382/225, 382/228, 103, 104, 173
See application file for complete search history.

(56) References Cited

U.S. PATENT DOCUMENTS

| | | | | |
|---|---|---|---|---|
| 7,184,580 | B2* | 2/2007 | Hamid | 382/124 |
| 7,558,762 | B2 | 7/2009 | Owechko et al. | |
| 7,672,911 | B2 | 3/2010 | Owechko et al. | |
| 7,769,210 | B2* | 8/2010 | Ito | 382/115 |
| 8,194,960 | B2* | 6/2012 | Nakamura | 382/131 |
| 2007/0076979 | A1* | 4/2007 | Zhang et al. | 382/282 |
| 2007/0183669 | A1* | 8/2007 | Owechko et al. | 382/224 |
| 2007/0183670 | A1* | 8/2007 | Owechko et al. | 382/224 |
| 2008/0075348 | A1* | 3/2008 | Rappaport et al. | 382/132 |
| 2009/0196510 | A1* | 8/2009 | Gokturk et al. | 382/224 |

OTHER PUBLICATIONS

Lin et al, "2D/3D face recognition using neural networks based on hybrid taguchi-particle swarm optimizaiton", 2008 IEEE, pp. 307-312.*
Notice of Allowability for U.S. Appl. No. 11/433,159.
Reply to Notice of Allowance for U.S. Appl. No. 11/433,159.
Notice of Allowability for U.S. Appl. No. 10/918,336.
Notice of Allowability for U.S. Appl. No. 11/800,265.
Notice of Allowability for U.S. Appl. No. 11/367,755.
Notice of Allowability for U.S. Appl. No. 11/385,983.
D. Nister and H. Stewenius, "Scalable recognition with a vocabulary tree," in Proc. CVPR , vol. 5, 2006.
S. Medasani and R. Krishnapuram, "Graph Matching by Relaxation of fuzzy assignments," IEEE Transactions on Fuzzy Systems, 9(1), 173-183, Feb. 2001.
R. Krishnapuram, S. Medasani, S. Jung and Y. Choi, "Content-Based Image Retrieval Based on a Fuzzy Approach," IEEE Transactions on Knowledge and Data Engineering (TKDE), Oct. 2004.

(Continued)

*Primary Examiner* — Kathleen Y Dulaney
(74) *Attorney, Agent, or Firm* — Tope-McKay & Associates

(57) ABSTRACT

Described is a system for rapid directed area search utilizing particle swarm optimization. The system first extracts salient regions from an input image. The system then detects regions of interest from the salient regions utilizing particle swarm optimization, wherein a swarm of software agents, or particles, cooperate to locate an objective function optima, or region of interest, in an image. A set of local feature descriptors are then extracted from the image, wherein a local feature descriptor corresponds to a neighborhood surrounding a point of interest in a region of interest in the image. Additionally, the set of local feature descriptors are clustered hierarchically into a database so that a closest match between a new input image and a stored image can be determined. Finally, the matching regions of the two images are registered to align matching regions to allow detection of changes between the images.

21 Claims, 4 Drawing Sheets

OTHER PUBLICATIONS

N. Oliver and A. Pentland, "Graphical models for driver behavior recognition in a smart car," Proc. of IV2000.

K. Sato and J.K. Aggarwal, "Temporal spatio-velocity transform and its application to tracking and interaction," CVIU 96(2004), 100-128.

S. Hongeng, R. Nevatia, and F. Bremond, "Vide-based event recognition: activity representation and probabilistic recognition methods," CVIU 96(2004), 129-162.

Medioni, I. Cohen, F. Bremond, S. Hongeng, R. Nevatia, "Event detection and analysis from video streams," IEEE PAMI 23(8), 2001, 873-889.

N. Oliver, A. Garg, and E. Horvitz, "Layered representations for learning and inferring office activity from multiple sensory channels," CVIU 96(2004), 163-180.

A. Amir, S. Basu, G. Iyengar, C. Lin, M. Naphade, J.R. Smith, S. Srinivasa, and B. Tseng, "A multi-modal system for retrieval of semantic video events," CVIU 96(2004), 216-236.

R.T. Collins, A. J. Lipton, and T. Kanade, "Introduction to the special section on video surveillance," IEEE-PAMI, 22(8), Aug. 2000.

N. Oliver, B. Rosario, and A. Pentland, "A Bayesian computer vision system for moceling human interactions," IEEE-PAMI, 22(8), Aug. 2000.

J.C. Bezdek, Pattern Recognition with Fuzzy Objective Function Algorithms, Plenum Press, New York, 1981.

M.P. Windham, "Numerical classification of proximity data with assignment measure," Journal of Classification, vol. 2, pp. 157-172, 1985.

S. Gold and A. Rangarajan, "A graduated assignment algorithm for graph matching," IEEE Transaction on Pattern Analysis and Machine Intelligence, vol. 18, pp. 377-387, Apr. 1996.

Z. Zhang, "A flexible new technique for camera calibration," IEEE Transactions on Pattern Analysis and Machine Intelligence, 22(11): 1330-1334, 2000.

Jean-Yves Bouguet, "Camera Calibration Toolbox for Matlab," http://www.vision.caltech.edu/bouguetj/calib_doc/.

Intel OpenCV Computer Vision Library (C++), http://www.intel.com/research/mrl/research/opencv/.

Giorgio Carpaneto, Paolo Toth, "Algorithm 548: Solution of the assignment problem [H]," ACM Transactions on Mathematical Software, 6(1): 104-111, 1980.

I. Hartley, A. Zisserman, "Multiple view geometry in computer vision," Cambridge University Press, Cambridge, UK 2000.

Longuet-Higgins, "A computer algorithm for reconstructing a scene from two projections" Nature, 293: 133-135, Sep. 1981.

T. Kailath, et al., "Linear Estimation," Prentice Hall, NJ, ISBN 0-13-022464-2, 854pp, 2000.

P. Saisan, "Modeling of Pedestrian Motion for recognition," IS&T/SPIE 17th annual symposium, San Jose, CA 2005.

A.R. Dick, et al., "Combining Single view recognition and multiple view stereo for architectural scenes," International Conference on Computer Vision (ICCV'01) vol. 1, Jul. 7-14, 2001, Vancouver, B.C., Canada.

G. Shakhanarovich, et al. "Integrated face and gait recognition from multiple views," In Proceedings of the IEEE Conference on Computer Vision and Pattern Recognition, Dec. 2001, Kauai, Hawaii.

Sujit Kuthirummal, et al., "Planar shape recognition across multiple views," In Proceedings of the Interationa Conference on Pattern Recognition (ICPR)—2002, Quebec, Canada.

Sujit Kuthirummal, et al., "Multiview constraints for recognition of planar curves in fourier domain," Proceedings of the Indian Conference on Vision Graphics and Image Processing (ICVGIP)—2002.

A. Selinger and R.C. Nelson, "Appearance-based object recognition using multiple views," In Proceedings of the IEEE Conference on Computer Vision and Pattern Recognition—Dec. 2001, Kauai, Hawaii.

V. Ciesielski and M. Zhang, "Using Genetic Algorithms to Improve the Accuracy of Object Detection," In Proceedings of the third Pacific-Asia Knowledge Discovery and Data Mining Conference, Ning Zhong and Lizhu Zhou (Eds.), Knowledge Discovery and Data Mining—Research and Practical Experiences. Tsinghua University Press, p. 19-24. Beijing, China, Apr. 26-31, 1999.

Kennedy, J., et al., "Swarm intelligence," San Francisco: Morgan Kaufmann Publishers, 2001.

R.C. Eberhart, et al., "Particle swarm optimization: Developments, applications, and resources," Proceedings of IEEE Congress on Evolutionary Computation (CEC 2001), Korea, 2001.

R. Brits, et al., "A Niching Particle Swarm Optimizer," 2002.

F. Rojas, I. Rojas, R. M. Clemente, and C.G. Puntoner, "Nonlinear blind source separation using genetic algorithms," in Proceedings of International Conference on Independent Component Analysis, 2001.

D. Beasley, D. R. Bull, and R. R. Martin, "A Sequential Niching Technique for Multimodal Function Optimization," Evolutionary Computation, 1(2), p. 101-125, 1993.

R. Krishnapuram and J. M. Keller, "Quantative Analysis of Properties and Spatial Relations of Fuzzy Image Regions," Transactions on Fuzzy Systems, 1(2):98-110, 1993.

Y. Owechko, S. Medasani, and N. Srinivasa, "Classifier Swarms for Human Detection in infrared imagery," Proc. of the CVPR workshop on Object Tracking and Classification Beyond the Visible Spectrum (OTCBVS'04) 2004.

Y. Owechko, et al., "Vision-Based Fusion System for Smart Airbag Applications," Intelligent Vehicle Symposium, 2002. IEEE, Publication Date: Jun. 17-21, 2002, vol. 1, on pp. 245-250 vol. 1.

Y. Owechko and S. Medasani, "A Swarm-based Volition/Attention Framework for Object Recognition," IEEE Conference on Computer Vision and Pattern Recognition, San Diego, Proc. of CVPR-WAPCV 2005.

Y. Owechko and S. Medasani, "Cognitive Swarms for Rapid Detection of Objects and Associations in Visual Imagery," IEEE Swarm Intelligence Symposium, Pasadena, 2005.

P. Saisan, S. Medasani, and Y. Owechko "Multi-View Classifier Swarms for Pedestrian Detection and Tracking," IEEE Conference on Computer Vision and Pattern Recognition, San Diego, 2005.

N. Srinivasa, et al., "Fuzzy edge-symmetry features for enhanced intruder detection," 11th International Conference on Fuzzy Systems, FUZZIEEE 2003.

F. Orabona, G. Metta, and G. Sandini, "Object-based Visual Attention: A Model for a Behaving Robot," in 3rd International Workshop on Attention and Performance in Computational Vision (in CVPR 2005), San Diego, CA, Jun. 2005.

B. J. Scholl, "Objects and Attention: The State of the Art," Cognition 80: 1-46, 2001.

Y. Sun and R. Fisher, "Hierarchical Selectivity for Object-based Visual Attention," submitted to Artificial Intelligence, 2004.

Liao, Wenhul and Ji, Qiang 2006, "Efficient Active Fusion for Decision-making via VOI Approximation," in Proc. AAAI 2006, 1180-1185.

Jaynes, C., Stolle, F., and Collins, R., "Task Driven Perceptual Organization for Extraction of Roofop Polygons," Proceedings of the ARPA Image Understanding Workshop, Monterey, California (Morgan Kaufmann Publishers, San Francisco, 1994), pp. 359-365.

A. Huertas, and R. Nevatia, "Detecting Changes in Aerial Views of Man-Made Structures," IVC200.

R. Mendes, "The Fully Informed Particle Swarm: Simpler, Maybe Better," Special issue of IEEE Trans. on Evol. Computation on Particle Swarm Optimization, vol. 8, No. 3, Jun. 2004.

K.E. Parsopoulos, et al. "On the Computation of All Global Minimizers Through Particle Swarm Optimization," Special issue of IEEE Trans. on Evol. Computation on Particle Swarm Optimization, vol. 8, No. 3, Jun. 2004.

F. van der Bergh, et al., "A Cooperative Approach to Particle Swarm Optimization," Special issue of IEEE Trans. on Evol. Computation on Particle Swarm Optimization, vol. 8, No. 3, Jun. 2004.

A. Ratnaweera, "Self-Organizing hierarchical particle Swarm Optimizer with Time-Varying Acceleration Coefficients," Special issue of IEEE Trans. on Evol. Computation on Particle Swarm Optimization, vol. 8, No. 3, Jun. 2004.

C.A. Coello, "Handling Multiple Objectives With Particle Swarm Optimization," Special issue of IEEE Trans. on Evol. Computation on Particle Swarm Optimization, vol. 8, No. 3, Jun. 2004.

L. Messerschmidt, et al., "Learning to Play Games Using a PSO-Based Competitive Learning Approach," Special issue of IEEE Trans. on Evol. Computation on Particle Swarm Optimization, vol. 8, No. 3, Jun. 2004.

M.P. Wachwiak, et al., "An Approach to Multimodal Biomedical Image Registration Utilizing Particle Swarm Optimization," Special issue of IEEE Trans. on Evol. Computation on Particle Swarm Optimization, vol. 8, No. 3, Jun. 2004.

R. Hassan, B. Cohanim, and O. de Weck, "A Comparison of Particle Swarm Optimization and the Genetic Algorithm," AIAA Conference, 2005.

J.F. Schutte, J.A. Reinbolt, B.j. Fregly, R.T. Haftka, and A.D. George, "Parallel Global Optimization with the Particle Swarm Algorithm," Int. J. Numerical methods in Engineering, 61: 2296-2315, 2004.

J. Kennedy and W.M. Spears, "Matching Algorithms to Problems: An Experimental Test of the Particle Swarm and Some Genetic Algorithms on the Multimodal Problem Generator," Proceedings of IEEE Inter. Conf. on Evolutionary Computation, 78-83, 1998.

Bradski, G. and S. Grossberg (1995), "Fast learning VIEWNET architectures for recognizing 3-D objects from multiple 2-D views," Neural Networks 8, 1053-1080.

Charniak, E. (1991), "Bayesian networks without tears," AI Magazine 12, 50-63.

Hu, W., D. Xie, et al. (2004), "Learning activity patterns using fuzzy self-organizing neural network," IEEE Transactions on Systems, Man, and Cybernetics—Part B: Cybernetics 34, 1618-1626.

Lazebnik, S., C. Schmid, et al. (2006), "Beyond bags of features: Spatial pyramid matching for recognizing natural scene categories," IEEE Conference on Computer Vision and Pattern Recognition, New York, NY.

Lowe, D. (1999), "Object recognition from local scale-invariant features," International Conference on Computer Vision, Corfu, Greece.

Medasani, S. and Y. Owechko (2007), "Behavior recognition using cognitive swarms and fuzzy graphs," SPIE Defense and Security Symposium, Orlando, FL.

S. Medasani, and Y. Owechko, "Possibilistic Particle Swarms for Optimization," Proceedings 5673 of SPIE/IST Symposium on Electronic Imaging, San Jose, 2005.

Park, S. and J. Aggarwal (2003), "A hierarchical Bayesian network for event recognition of human actions and interactions," ACM SIGMM International Workshop on Video Surveillance, Berkely, CA.

Barbara Zitova and Jan Flusser, "Image registration methods: a survey," Image and Vision Computing 21, pp. 977-1000, 2003.

B. Bhanu, et al., "Adaptive Image Segmentation Using a Genetic Algorithm," IEEE Transactions on Systems, Man, and Cybernetics, vol. 25, No. 12, Dec. 1995.

Office action from U.S. Appl. No. 10/918,336.

Khosla, D., Moore, C., and Chelian, S. (2007). A Bioinspired system for spatio-temporal recognition in static and video imagery. Proceedings of SPIE, 6560: 656002.

Judea Pearl, et al., "Bayesian Networks," Handbook of Brain Theory and Neural Networks, Technical Report, R-277, Nov. 2000.

Avrim Blum (1996), "On-Line Algorithms in Machine Learning", in Proceedings of the Workshop on On-Line Algorithms.

D.L. Swets, et al., "Genetics Algorithms for Object Recognition in a complex scene," Proc. of Intl. Conference on Image Processing, vol. 2, Oct. pp. 23-26, 1995.

* cited by examiner

VISION-BASED METHOD FOR RAPID DIRECTED AREA SEARCH

BACKGROUND OF THE INVENTION

(1) Field of Invention

The present invention relates to a system for rapid directed area search and, more particularly, to a system for rapid directed area search which utilizes particle swarm optimization and hierarchical representation schemes.

(2) Description of Related Art

Current approaches to advancing the fields of image analysis include improving detection of salient points, creating image registration algorithms that take into account differential motion and parallax, and exhaustive searches for detecting objects of interest. Due to the computational complexity involved, such approaches are not completely suitable for wide-area imagery.

Recent technological advances have enabled rapid acquisition of copious volumes of imagery from air and space borne platforms. However, only a small percent of the terabytes of information that is logged is analyzed by human analysts. Humans are excellent at analyzing images (i.e., finding low frequency targets of interest in large datasets), but are costly, slow, and fatigue easily. Moreover, the data being analyzed typically includes long intervals between interesting regions, which may be better handled by automated systems.

One aspect of image analysis involves directed area search where the goal is to detect an object of interest. Tasks may include, but are not limited to, finding a moving vehicle and locating a commuter plane crash. The search space for such tasks may range from tens to hundreds of miles. Objects of interest typically have very few pixels and are sensed using gigapixel cameras. In current approaches, some of the objects of interest in a goal driven search may not have suitable templates readily available.

The present invention addresses the question of how interesting objects can be rapidly detected and recognized in imagery that may vary in appearance and/or be embedded in a vast variety of background clutter. Human visual search solves this problem, in part, by combining fast bottom-up reflexive attention cues with slower top-down cognitive processing. Biologically inspired bottom-up attention mechanisms are well understood, quite accurate, and of relatively low complexity. Additionally, the computational models of these mechanisms are fairly easy to implement. In contrast, top-down recognition models are not completely understood, have high computational complexity, and do not have accuracy levels that are suitable for real-world applications.

The present invention attempts to achieve scalable human-like visual search processing and accuracy by combining computational models for bottom-up attention mechanisms for focusing on salient regions, with fast and accurate top-down recognition algorithms for detecting changes, new activities, and anomalous objects.

SUMMARY OF THE INVENTION

The present invention relates to a system for rapid directed area search utilizing particle swarm optimization. The system comprises one or more processors that are configured to perform operations of first extracting at least one salient region from a new input image. At least one region of interest is detected from a salient region in the new input image by operating a plurality of software agents as a cooperative swarm to locate an objective function optima, wherein the objective function optima is determined according to particle swarm optimization dynamics, and wherein the objective function optima corresponds to a region of interest in the new image. Additionally, a set of local feature descriptors are extracted from the new input image, where each local feature descriptor corresponds to a neighborhood surrounding a point of interest in a region of interest in the image. Then, the set of local feature descriptors are clustered and indexed into a database having a plurality of nodes organized as a hierarchical structure. The set of extracted local feature descriptors from the new input image are detected and matched with a set of extracted local feature descriptors from an old image retrieved from the database using particle swarm optimization dynamics. A registration transformation that matches the new input image and the old image is calculated. At least one matching region of the new input image and the old image is registered, such that the registering of the matching region aligns the images. Finally, the system is configured to detect at least one changed region between the new input image and the old image, and the changed region is either stored or presented.

In another aspect, the set of local feature descriptors are clustered hierarchically using fuzzy c-means.

In another aspect, the system is further configured to perform operations of partitioning the set of local feature descriptors into a plurality of clusters with each iteration, wherein the partitioning is repeated with each iteration until the plurality of clusters are homogeneous.

In another aspect, the system is further configured to perform operations of forming a plurality of index tables at each node, wherein the plurality of index tables indicate whether an image stored in the database contains a feature vector contained in a cluster in addition to a location of the image in the database.

In another aspect, the system is further configured to perform operations of detecting an object of interest in the at least one changed region using particle swarm optimization dynamics.

In yet another aspect, the closest match in the database for the new input image is determined by comparing a set of extracted local feature descriptors from the new input image to the local feature descriptors of images stored in the database.

As can be appreciated by one in the art, the present invention also comprises a method for causing a processor to perform the operations described herein.

Finally, the present invention also comprises a computer program product comprising computer-readable instruction means stored on a computer-readable medium that are executable by a computer having a processor for causing the processor to perform the operations described herein.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
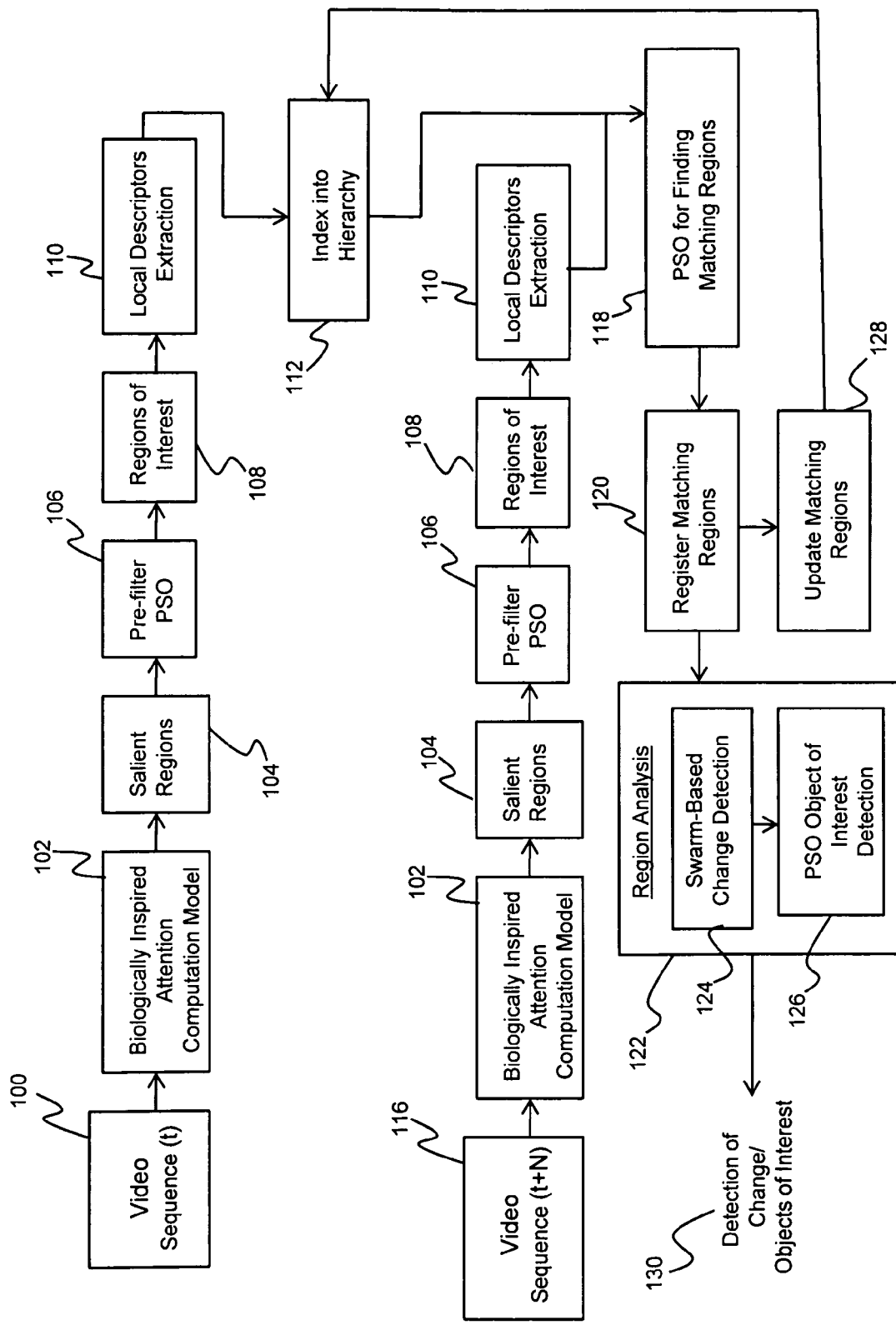
FIG. 1 is a block diagram illustrating a method for directed area search according to the present invention.

The present invention relates to a system for rapid directed area search and, more particularly, to a system for rapid directed area search which utilizes particle swarm optimization and hierarchical representation schemes. The following description is presented to enable one of ordinary skill in the art to make and use the invention and to incorporate it in the context of particular applications. Various modifications, as well as a variety of uses, in different applications will be readily apparent to those skilled in the art, and the general principles defined herein may be applied to a wide range of embodiments. Thus, the present invention is not intended to be limited to the embodiments presented, but is to be accorded with the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

(1) Principal Aspects

The present invention has three "principal" aspects. The first is a system for rapid directed area search utilizing particle swarm optimization (PSO). The system is typically in the form of a computer system, computer component, or computer network operating software or in the form of a "hard-coded" instruction set. This system may take a variety of forms with a variety of hardware devices and may include computer networks, handheld computing devices, cellular networks, satellite networks, and other communication devices. As can be appreciated by one skilled in the art, this system may be incorporated into a wide variety of devices that provide different functionalities. The second principal aspect is a method for rapid area search utilizing PSO, typically in the form of software, operated using a data processing system (computer or computer network). The third principal aspect is a computer program product. The computer program product generally represents computer-readable instruction means stored on a computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories.

The term "instruction means" as used with respect to this invention generally indicates a set of operations to be performed on a computer, and may represent pieces of a whole program or individual, separable, software modules. Non-limiting examples of "instruction means" include computer program code (source or object code) and "hard-coded" electronics (i.e. computer operations coded into a computer chip). The "instruction means" may be stored in the memory of a computer or on a computer-readable medium such as a floppy disk, a CD-ROM, and a flash drive. These aspects will be described in more detail below.

(2) Specific Details

The present invention attempts to achieve scalable human-like visual search processing and accuracy by combining computational models for bottom-up attention mechanisms for focusing on salient regions, with fast and accurate top-down recognition algorithms for detecting changes, new activities, and anomalous objects. The integrated system described herein can rapidly find regions with significant changes from the baseline, adapt the baseline, and increase overall system efficiency by enabling near real-time exploitation of strategic video intelligence. The system, method, and computer program product described below can be applied to detecting any type of object of interest under the supervision of an analyst, provided that the classifier or detectors for that object (e.g., vehicle, building, plane crash) are available.

Imagery, which serves as input data for the present invention, is typically collected by giga-pixel sensors which periodically fly over terrains of interest. The imagery is typically collected by giga-pixels sensors that periodically fly over terrains of interest. An efficient model for indexing the imagery using salient signatures present in the data is needed to enable retrieval of previously ingested data that is closest to the data being collected from a current run. Indexing of the imagery would provide the ability to automatically register two views, find regions that have changed, and analyze all such regions.

FIG. 1 depicts a method for a directed area search according to the present invention. The input data 100, either an image or video sequence parsed into key frames, is first analyzed using biologically inspired (bio-inspired) attention computation models 102 to extract salient regions 104. Bio-inspired computation models 102 take an evolutionary approach to analysis through the utilization of, for example, evolutionary algorithms, such as genetic algorithms, and swarm intelligence algorithms, such as particle swarm optimization (PSO) algorithms. The bio-inspired attention computation models use low-level image features for identifying center-surround salient regions and typically detect regions that are visually different from their surroundings. Once the salient regions 104 are extracted, a pre-filter version of a set of PSO-based algorithms 106 are run to detect only the regions of interest 108, where regions of interest 108 represent specific objects of interest.

PSO is a simple but powerful population-based algorithm that is effective for optimization of a wide range of functions. Generally speaking, PSO is a relatively simple evolutionary optimization method that has its roots in the modeling of the behavior of groups of biological organisms. Examples of such groups include bird flocks or bee swarms as described by Kennedy et al. in "Swarm Intelligence", San Francisco: Morgan Kaufmann Publishers, 2001, and by Eberhart and Shi in "Particle Swarm Optimization: Developments, Applications, and Resources", 2001. The cited references are hereby incorporated by reference as though fully included herein. PSO models the exploration of a multi-dimensional solution space by a "swarm" of software agents, or particles, where the success of each agent has an influence on the dynamics of other members of the swarm. Each particle in the swarm resides in a multi-dimensional solution space. The positions of the particles represent candidate problem solutions. Additionally, each particle has a velocity vector that allows it to explore the space in search of an objective function optima. Each particle i keeps track of a position vector $\vec{y}_i$ that represents the current best solution the particle has found. Another position vector $\vec{y}_g$ is used to store the current global best solution found by all of the particles. The velocity and position vectors for particle i are then changed probabilistically according to the following set of dynamic update equations:

$$\vec{v}_i(t+1) = w\vec{v}_i(t) + c_1 q_1 [\vec{y}_i(t) - \vec{x}_i(t)] + c_2 q_2 [\vec{y}_g(t) - \vec{x}_g(t)]$$
$$\vec{x}_i(t+1) = \vec{x}_i(t) + x\vec{v}_i(t+1),$$

where $\vec{x}_i(t)$ and $\vec{v}_i(t)$ are the position and velocity vectors at time t of the i-th particle and $c_1$ and $c_2$ are parameters that weight the influence of the "individual best" and "swarm best" terms. w is a momentum constant that prevents premature convergence, and x is a constriction factor which also influences the convergence of PSO. $q_1$ and $q_2$ are random variables that allow the particles to better explore the solution space. The described dynamics cause the swarm to concentrate on promising regions of solution space very quickly with very sparse sampling of the solution space.

In the present invention, the system is configured to operate a plurality of software agents as a cooperative swarm to locate an objective function optima. Each agent is assigned an initial velocity vector to explore a multi-dimensional solution space and is configured to perform at least one iteration. The iteration is a search in the multi-dimensional solution space for a potential objective function optima. As described above, each agent keeps track of a first position vector representing a current individual best solution that the agent has identified and a second position vector used to store the current global best solution among all agents. In the present invention, the objective function optima corresponds to a region of interest in the image.

As a non-limiting example, analysis of the input data 100 (e.g., a scene) using the bio-inspired attention computation models 102 extracts all of the bushes, buildings, and cars as salient regions 104 while the pre-filter PSO-based algorithms 106 sub-select regions of interest 108, such as either only the cars or the buildings. Local feature descriptors 110 are then extracted at points of interest in the regions of interest 108. As non-limiting examples, the local feature descriptors 110 can be obtained using the Harris corner detector or the Matas's maximally stable extremal regions (MSER) algorithms. The local feature descriptors 110 represent a neighborhood around the point of interest. As a non-limiting example, the scale-invariant feature transform (SIFT)-feature algorithm is used to extract the descriptor. These local feature descriptors 110, which are based on the behavior of complex cells in the cerebral cortex, have been shown to be scale and rotation invariant to minor deformations, partially invariant to illumination changes, and very useful as robust region signatures.

The next step after extraction of points of interest and local feature descriptors 110 is efficient indexing 112 to allow different images to be efficiently stored in a database having a plurality of nodes. As a non-limiting example, the local feature descriptors 110 are then clustered hierarchically using fuzzy c-means. Alternatively, the local feature descriptors 110 can be clustered using k-means clustering or other means for hierarchical clustering. A review of data clustering can be found in "Data Clustering: A Review" by Jain et al. in ACM Computing Surveys, Vol. 31, No. 3, 1999, which is hereby incorporated by reference as though fully included herein. In each iteration, the local descriptor features are partitioned into a few clusters, and the process is recursively repeated until the clusters are homogenous and need no further partitioning. Thus, at each of the nodes in the hierarchy (e.g., vocabulary tree), index tables are formed that indicate where and which stored images contain the feature vectors contained in that cluster. The hierarchical structure scales effectively to large volumes of data. This completes the ingest process and provides a user with a baseline for doing change detection and detecting other objects of interest in images or video sequences.

As illustrated in FIG. 1, when a new input image or video sequence 116 is obtained, the above method of first extracting salient regions 104 with the bio-inspired attention computation models 102, detecting regions of interest 108 with PSO-based algorithms 106, and extracting local feature descriptors 110 is repeated. The path traversed by each local feature descriptor down the hierarchical structure of the database is used to determine the closest match in the database for the input query (e.g., new video sequence 116 t+N, where t is a frame in the video sequence and N is a positive integer). In a desired aspect, PSO-based algorithms are also utilized for finding matching regions 118 in the images 100 and 116. In the process of finding matching regions 118, particle swarms are used to rapidly locate a set of distributed salient points from the imagery 100 and 116. In a desired aspect, the objective function for the salient point detection is either a Harris corner point or a maximally stable region detector. Note that the use of the particle swarm algorithm obviates the need for processing the entire image to locate all points of interest in the image.

Once the matching imagery is retrieved, the matching regions are registered, as the input query (e.g., new video sequence 116) and the retrieved image 100 may have been collected using different cameras or lenses. The image registration process 120 allows alignment of the imagery so that changes between the images can be detected (i.e., changes from an estimated baseline). The image registration process 120 involves calculating the registration transformation that can match the imagery. It is assumed that each of the neighborhoods around the points of interest can be registered using a simple affine transformation. Any of the standard procedures can be used to find the best transformation. Conventional approaches to image registration are presented by Zitova and Flusser in "Image Registration Methods: A Survey," Image and Vision Computing, 21:977-1000, 2003, which is hereby incorporated by reference as though fully included herein. As described by the authors, current approaches rely on the following steps: selecting and finding a set of features from the candidate images to be registered; matching the features from one image to those of the other image; and estimating a transformation based on the set of matches. If the transformation is not truly affine, a heuristic search method can be applied to calculate the transformation, a non-limiting example of which includes a search method utilizing PSO.

Once the image registration 120 is complete, the matching regions are analyzed through a region analysis 122 process using particle-swarm based algorithms, which analyze the retrieved image 100 and the new video sequence 116. The region analysis 122 process attempts to detect changed regions. In a desired aspect, a first stage 124 of the process relies on swarm-based change detection of moving regions and a bio-inspired attention computation model. The detected changed region is then stored and/or presented as output for display or for further processing. In a second stage 126 of the region analysis 122, detection of an object of interest occurs. In this stage 126, the system determines whether the changed region identified in the first stage 124 contains the object of interest (e.g., a vehicle), which will be described in more detail below. The registered matching regions from the image registration 120 process can be updated 128 for indexing 112 into the hierarchical database. The resulting output 130 may be, as a non-limiting example, a set of image chips containing the objects of interest.

Figure 2:
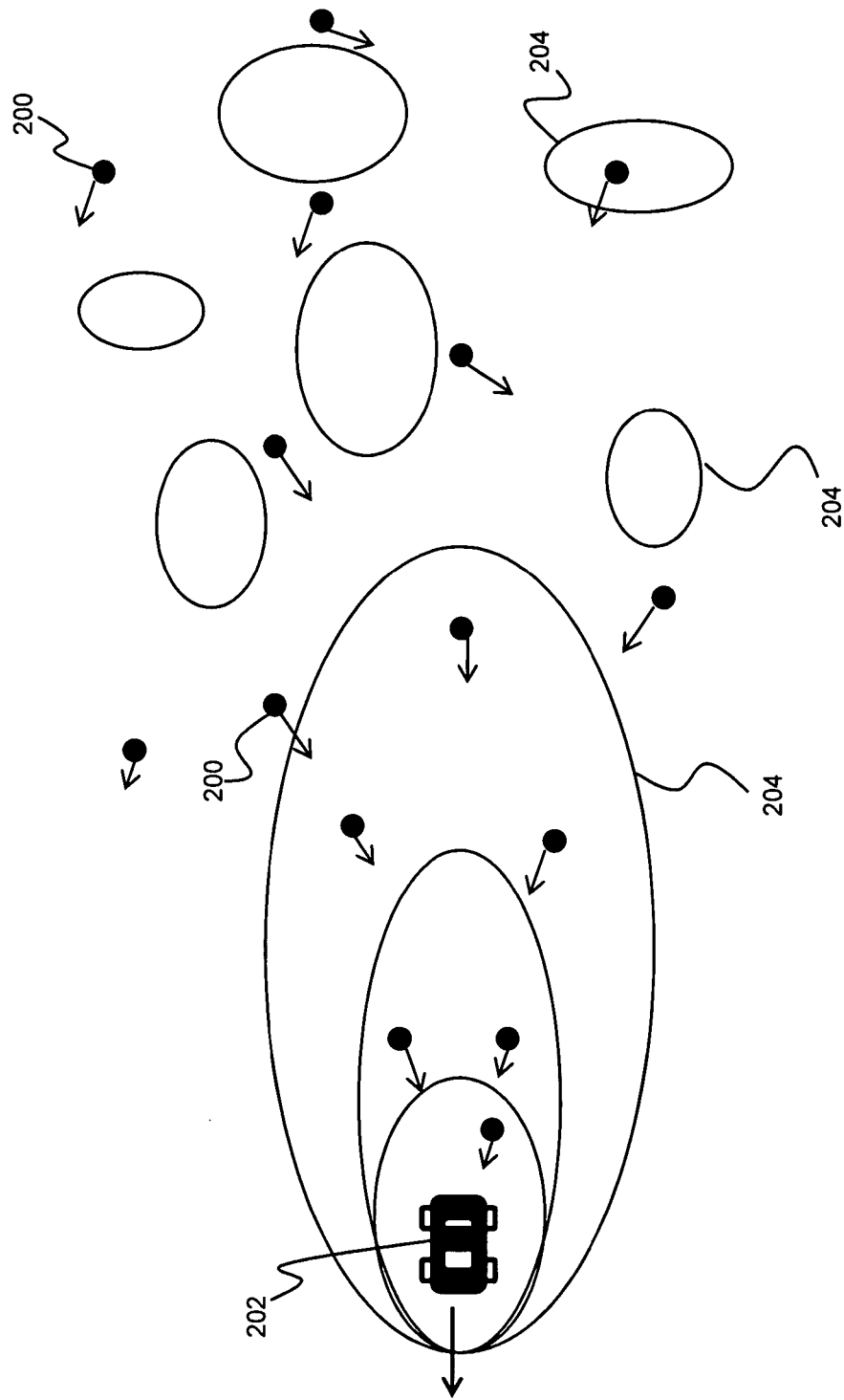
FIG. 2 illustrates particle swarm optimization dynamics for detection of objects according to the present invention.

FIG. 2 illustrates PSO dynamics used to guide a swarm of software agents, or particles, towards an object of interest according to the present invention. PSO dynamics enable efficient object detection and verification. In the present invention and as depicted in FIG. 2, a swarm of software agents 200 uses change-based attention to find a vehicle 202 region by using an objective function for PSO that measures the amount of change in a frame relative to a previous frame. Such an objective function can be based on the amount of residual image left after the second frame is subtracted from the first frame. The swarm 200 then switches to an object classification mode to locate and verify the vehicle 202. A set of disconnected change sub-regions 204, shown as individual regions set apart from the vehicle, consist of vehicle-related changes, non-limiting examples of which include changes due to motion, shadows, dust plumes, exhaust, tracks, and other associated vehicles.

Figure 3:
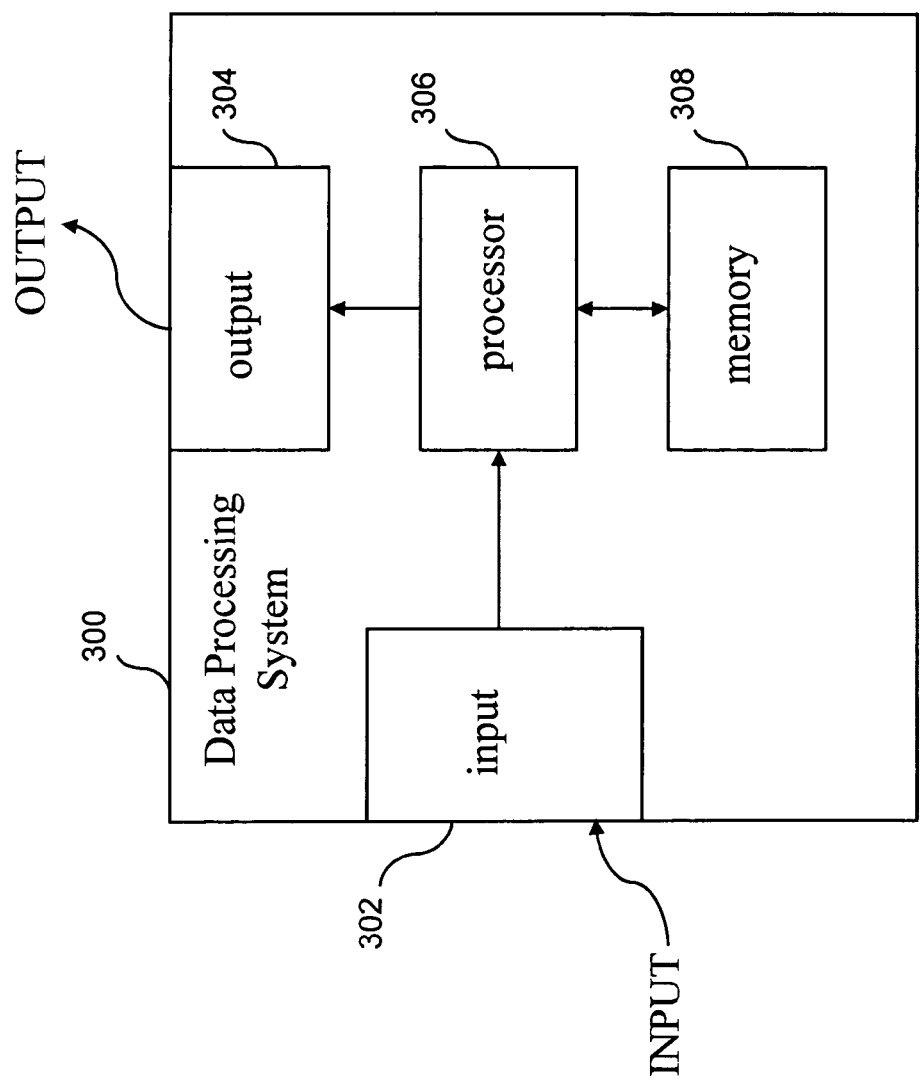
FIG. 3 is an illustration of a data processing system according to the present invention.

FIG. 3 illustrates a block diagram depicting components of a data processing system 300 (e.g., computer) incorporating the operations of the method described above. The method utilizes a data processing system 300 for storing computer executable instruction means for causing a processor (or processors) to carry out the operations of the above described method. The data processing system 300 comprises an input 302 for receiving information from a user. Information received may include input from devices such as cameras, scanners, keypads, keyboards, microphone, other peripherals such as storage devices, other programs, etc. The input 302 may include multiple "ports." An output 304 is connected with a processor 306 for providing information for transmission to other data processing systems, to storage devices, to display devices such as monitors, to generating information necessary for delivery, and to other mechanisms for presentation in user-usable forms. The input 302 and the output 304 are both coupled with the processor 306 (or processors), which may be a general-purpose computer processor or a specialized processor designed specifically for use with the present invention. The processor 306 is coupled with a memory 308 to permit storage of data and software to be manipulated by commands to the processor 306.

Figure 4:
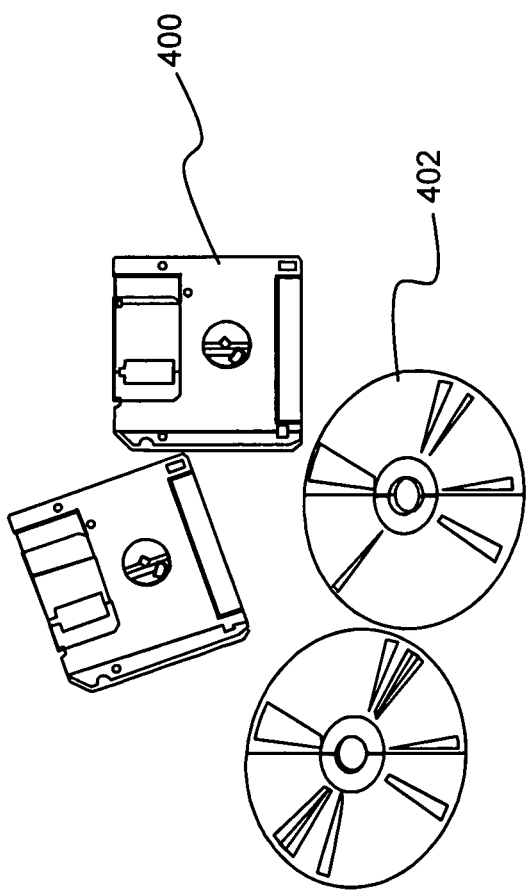
FIG. 4 is an illustration of a computer program product according to the present invention.

An illustrative diagram of a computer program product embodying the present invention is depicted in FIG. 4. As a non-limiting example, the computer program product is depicted as either a floppy disk 400 or an optical disk 402. However, as mentioned previously, the computer program product generally represents instruction means (i.e., computer readable code) stored on any compatible computer readable medium.

What is claimed is:

1. A system for rapid directed area search, the system comprising one or more processors that are configured to perform operations of:
   extracting at least one salient region from a new input image;
   detecting at least one region of interest from a salient region in the new input image by operating a plurality of software agents as a cooperative swarm to locate an objective function optima, wherein the objective function optima is determined according to particle swarm optimization dynamics, and wherein the objective function optima corresponds to a region of interest in the new input image;
   extracting a set of local feature descriptors from the new input image;
   clustering and indexing the set of local feature descriptors into a database having a plurality of nodes organized as a hierarchical structure;
   detecting and matching the set of extracted local feature descriptors from the new input image with a set of extracted local feature descriptors from an old image retrieved from the database using particle swarm optimization dynamics;
   calculating a registration transformation that matches the new input image and the old image;
   registering at least one matching region of the new input image and the old image, wherein registering of the at least one matching region aligns the images;
   detecting at least one changed region between the new input image and the old image, wherein the at least one changed region is stored or presented.

2. A system for rapid directed area search as set forth in claim 1, wherein the set of local feature descriptors are clustered hierarchically using fuzzy c-means.

3. A system for rapid directed area search as set forth in claim 2, wherein the system is further configured to perform operations of partitioning the set of local feature descriptors into a plurality of clusters with each iteration, wherein the partitioning is repeated with each iteration until the plurality of clusters are homogeneous.

4. A system for rapid directed area search as set forth in claim 3, wherein the system is further configured to perform operations of forming a plurality of index tables at each node, wherein the plurality of index tables indicate whether an image stored in the database contains a feature vector contained in a cluster in addition to a location of the image in the database.

5. A system for rapid directed area search as set forth in claim 4, wherein the system is further configured to perform operations of detecting an object of interest in the at least one changed region using particle swarm optimization dynamics.

6. A system for rapid directed area search as set forth in claim 1, wherein the system is further configured to perform operations of detecting an object of interest in the at least one changed region using particle swarm optimization dynamics.

7. A system for rapid directed area search as set forth in claim 1, wherein the system further performs operations of forming a plurality of index tables at each node, wherein the plurality of index tables indicate whether an image stored in the database contains a feature vector contained in a cluster in addition to a location of the image in the database.

8. A computer-implemented method for rapid directed area search, the method comprising an act of causing a processor to perform operations of:
   extracting at least one salient region from a new input image;

detecting at least one region of interest from a salient region in the new input image by operating a plurality of software agents as a cooperative swarm to locate an objective function optima, wherein the objective function optima is determined according to particle swarm optimization dynamics, and wherein the objective function optima corresponds to a region of interest in the new input image;

extracting a set of local feature descriptors from the new input image;

clustering and indexing the set of local feature descriptors into a database having a plurality of nodes organized as a hierarchical structure;

detecting and matching the set of extracted local feature descriptors from the new input image with a set of extracted local feature descriptors from an old image retrieved from the database using particle swarm optimization dynamics;

calculating a registration transformation that matches the new input image and the old image;

registering at least one matching region of the new input image and the old image, wherein registering of the at least one matching region aligns the images;

detecting at least one changed region between the new input image and the old image, wherein the at least one changed region is stored or presented.

9. A method for rapid directed area search as set forth in claim 8, wherein the set of local feature descriptors are clustered hierarchically using fuzzy c-means.

10. A method for rapid directed area search as set forth in claim 9, wherein the method further comprises an act of partitioning the set of local feature descriptors into a plurality of clusters with each iteration, wherein the partitioning is repeated with each iteration until the plurality of clusters are homogeneous.

11. A method for rapid directed area search as set forth in claim 10, wherein the method further comprises an act of forming a plurality of index tables at each node, wherein the plurality of index tables indicate whether an image stored in the database contains a feature vector contained in a cluster in addition to a location of the image in the database.

12. A method for rapid directed area search as set forth in claim 11, wherein the method further comprises an act of detecting an object of interest in the at least one changed region using particle swarm optimization dynamics.

13. A method for rapid directed area search as set forth in claim 8, wherein the method further comprises an act of forming a plurality of index tables at each node, wherein the plurality of index tables indicate whether an image stored in the database contains a feature vector contained in a cluster in addition to a location of the image in the database.

14. A method for rapid directed area search as set forth in claim 8, wherein the method further comprises an act of detecting an object of interest in the at least one changed region using particle swarm optimization dynamics.

15. A computer program product for rapid directed area search, the computer program product comprising computer-readable instruction means stored on a non-transitory computer-readable medium that are executable by a computer having a processor for causing the processor to perform operations of:

extracting at least one salient region from a new input image;

detecting at least one region of interest from a salient region in the new input image by operating a plurality of software agents as a cooperative swarm to locate an objective function optima, wherein the objective function optima is determined according to particle swarm optimization dynamics, and wherein the objective function optima corresponds to a region of interest in the new input image;

extracting a set of local feature descriptors from the new input image;

clustering and indexing the set of local feature descriptors into a database having a plurality of nodes organized as a hierarchical structure;

detecting and matching the set of extracted local feature descriptors from the new input image with a set of extracted local feature descriptors from an old image retrieved from the database using particle swarm optimization dynamics;

calculating a registration transformation that matches the new input image and the old image;

registering at least one matching region of the new input image and the old image, wherein registering of the at least one matching region aligns the images;

detecting at least one changed region between the new input image and the old image, wherein the at least one changed region is stored or presented.

16. A computer program product for rapid directed area search as set forth in claim 15, wherein the set of local feature descriptors are clustered hierarchically using fuzzy c-means.

17. A computer program product for rapid directed area search as set forth in claim 16, wherein the computer program product further comprises instruction means for partitioning the set of local feature descriptors into a plurality of clusters with each iteration, wherein the partitioning is repeated with each iteration until the plurality of clusters are homogeneous.

18. A computer program product for rapid directed area search as set forth in claim 17, wherein the computer program product further comprises instruction means for forming a plurality of index tables at each node, wherein the plurality of index tables indicate whether an image stored in the database contains a feature vector contained in a cluster in addition to a location of the image in the database.

19. A computer program product for rapid directed area search as set forth in claim 18, wherein the computer program product further comprises instruction means for detecting an object of interest in the at least one changed region using particle swarm optimization dynamics.

20. A computer program product for rapid directed area search as set forth in claim 15, wherein the computer program product further comprises instruction means for forming a plurality of index tables at each node, wherein the plurality of index tables indicate whether an image stored in the database contains a feature vector contained in a cluster in addition to a location of the image in the database.

21. A computer program product for rapid directed area search as set forth in claim 15, wherein the computer program product further comprises instruction means for detecting an object of interest in the at least one changed region using particle swarm optimization dynamics.

* * * * *